(12) United States Patent
Ziomek

(10) Patent No.: US 10,585,834 B2
(45) Date of Patent: Mar. 10, 2020

(54) I2C DEVICE EXTENDER FOR INTER-BOARD COMMUNICATION OVER A SINGLE-CHANNEL BIDIRECTIONAL LINK

(71) Applicant: Linear Technology Holding LLC, Norwood, MA (US)

(72) Inventor: Jason J. Ziomek, South Burlington, VT (US)

(73) Assignee: Linear Technology Holding LLC, Norwood, MA (US)

(*) Notice: Subject to any disclaimer, the term of this patent is extended or adjusted under 35 U.S.C. 154(b) by 219 days.

(21) Appl. No.: 15/676,820

(22) Filed: Aug. 14, 2017

(65) Prior Publication Data

US 2018/0373662 A1 Dec. 27, 2018

Related U.S. Application Data

(60) Provisional application No. 62/523,161, filed on Jun. 21, 2017.

(51) Int. Cl.
*G06F 13/40* (2006.01)

(52) U.S. Cl.
CPC ...... *G06F 13/4027* (2013.01); *G06F 13/4045* (2013.01); *G06F 2213/0016* (2013.01)

(58) Field of Classification Search
CPC ............. G06F 13/4027; G06F 13/4045; G06F 2213/0016
See application file for complete search history.

(56) References Cited

U.S. PATENT DOCUMENTS

| | | | | |
|---|---|---|---|---|
| 2005/0094676 A1* | 5/2005 | Iwami | ................. | G06F 13/4045 370/527 |
| 2006/0290381 A1* | 12/2006 | Bui | ...................... | G06F 13/4072 326/91 |
| 2007/0157060 A1* | 7/2007 | Ganga | ................... | H03M 13/33 714/752 |
| 2009/0031065 A1* | 1/2009 | Travers | ................... | H04L 1/205 710/110 |
| 2012/0331183 A1* | 12/2012 | Hess | ....................... | G06F 13/00 710/19 |
| 2013/0304954 A1* | 11/2013 | Decesaris | .............. | G06F 13/38 710/110 |
| 2015/0281871 A1* | 10/2015 | Poulsen | ................. | H04L 69/08 370/328 |
| 2017/0168976 A1* | 6/2017 | Yost | ..................... | G06F 13/4282 |

* cited by examiner

*Primary Examiner* — Eric T Oberly
(74) *Attorney, Agent, or Firm* — Patent Law Group; Brian D. Ogonowsky

(57) ABSTRACT

A first circuit board includes a master device and slave devices communicating with each other via a local first I2C bus. To allow I2C networks to communicate with each other over long distances, such as up to 1200 meters, a first interface device converts the I2C data signals to encoded differential data over a twisted wire pair. A second interface device on a remote circuit board converts the differential data to data and clock signals on its local second I2C bus coupled to other slave devices on the same board. This is equivalent to the two boards sharing the same I2C bus. The interface devices pull down the serial clock line (SCL) in their local I2C bus while waiting for data, such as an acknowledge bit. The master device generates the clock signal for its local I2C bus, and the remote interface device generates the clock signal for its local I2C bus.

22 Claims, 4 Drawing Sheets

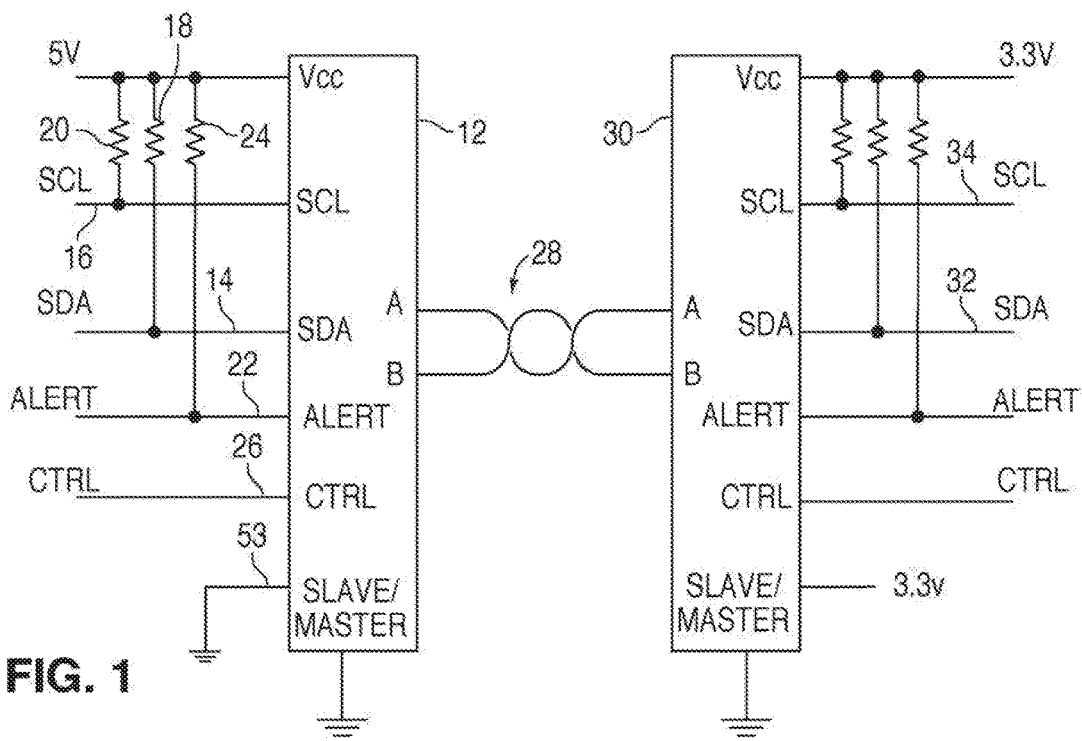
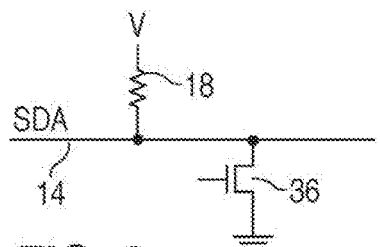
FIG. 2
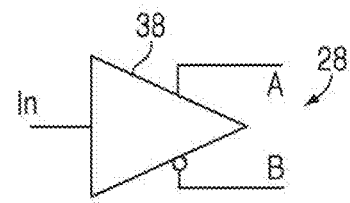
FIG. 3
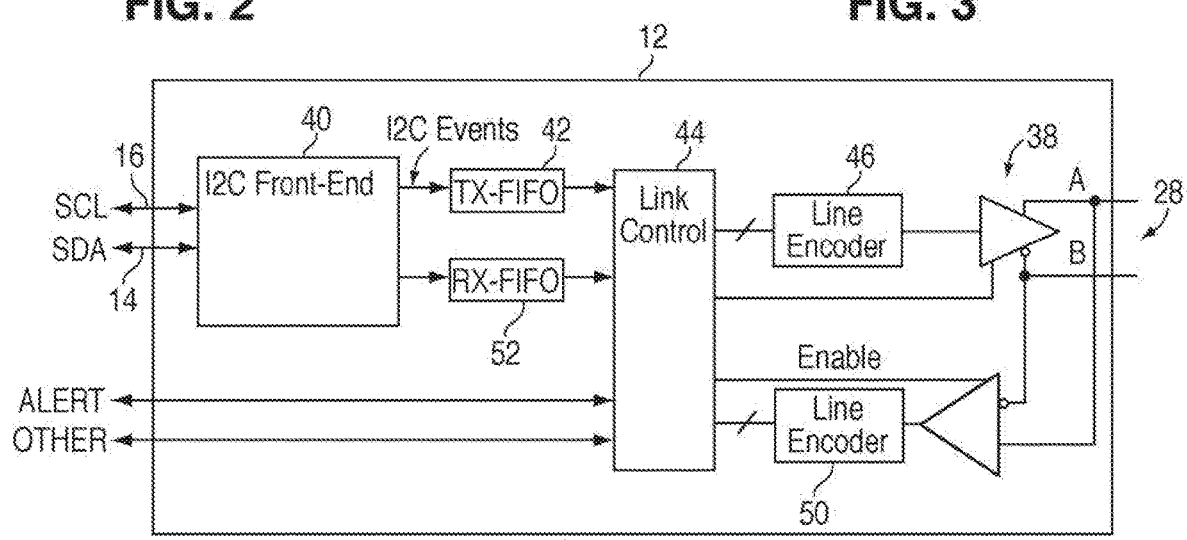
FIG. 4

I2C DEVICE EXTENDER FOR
INTER-BOARD COMMUNICATION OVER A
SINGLE-CHANNEL BIDIRECTIONAL LINK

CROSS-REFERENCE TO RELATED
APPLICATIONS

This application is based on and claims priority from U.S. Provisional Application Ser. No. 62/523,161, filed Jun. 21, 2017, by Jason J. Ziomek, incorporated herein by reference.

FIELD OF THE INVENTION

This invention relates to I2C networks, where one I2C bus wire carries binary data and control codes (e.g., START/STOP) by using a passive pull-up resistor and an open drain pull-down MOSFET, and a second I2C bus wire carries a clock signal by using a passive pull-up resistor and an open drain pull-down MOSFET. This invention particularly relates to a local "slave" interface device that converts I2C bus data, clock, and codes to an encoded, single-channel bit stream, such as differential signals over a twisted wire pair, where an identical remote interface device on a remote circuit board converts the differential signal back to the original data and code signals, and generates clock signals, for application to a local I2C bus on the remote circuit board.

BACKGROUND

I2C networks are common and use well-known established protocols. In an 2C network, a single wire carries serial data and codes over a serial data line (SDA), and a second wire carries a clock signal over a serial clock line (SCL). This may be referred to as dual signaling, or dual signal channel communications, since the clock signal and data signal are separately transmitted. A reference voltage, such as ground, is locally provided. The wires are passively pulled up by resistors connected to, for example, 5V or 3.3V. The wires are pulled down by open-drain MOSFETs. It is desirable to keep the pull-up resistance value high, such as greater than 2K Ohms, to limit the current drawn. Due to capacitive loading on the wires, the wire length is limited, such as to a few feet. The maximum allowable capacitance is 400 pF. Typically, I2C is for communications within the same circuit board. The data speed is limited due to the capacitance, and 100 kbps-400 kbps is common.

The I2C network interconnects master and slave devices on the same board. The master is the device requesting information from an addressed slave and, in response, the slave transmits the requested information. It is typical to have only one master on a single circuit board and multiple slaves. Only one device controls the I2C bus at a time. There are protocols for arbitration.

The well-established I2C protocol standard includes rules for starting, stopping, interrupting, addressing, etc. For example, for starting a packet (a START code), the SCL is pulled high while the SDA transitions its state from high to low. A 7-bit address code is then transmitted followed by a read/write bit to inform the slave whether the master is writing to it or reading from it. Only the addressed slave responds to the message. The data signals are "detected" by the addressed receiver at a sampling time occurring at the transition from low to high on the SCL. An acknowledge bit ACK is transmitted from the "receiving device" to the "transmitting device" after the address (plus R/W bit) and after every 8-bit byte received. For a multi-byte message, only after a byte is transmitted and the ACK signal is received, is another byte transmitted. Clock stretching (holding the SCL low for an extended length of time) may be used to stall the bus while waiting for a response from a slave device. For designating the end of the packet (a STOP code), the SCL is pulled high while the SDA transitions its state from low to high. Only a device acting as a master generates the SCL signals, with the exception that the slave can hold the SCL low for clock stretching.

It is common for an I2C network to also be compatible with the SMBus protocol. The SMBbus protocol is also a well-known standard. The SMBus protocol also includes various codes and protocols for communications, such as an ALERT code.

If a circuit board needs to communicate with another circuit board that is more than a few feet away, the I2C network will most likely have too high a capacitance for the desired bit frequency and signal amplitude. Therefore, an I2C network cannot be used with long cables or even in noisy environments where noise can be coupled onto the cable. For this reason, I2C networks are typically used only for intra-board communications.

What is needed is a technique to communicate between a local I2C network and a remote I2C network that is located more than a few feet away. The system should be robust and be able to operate in a noisy environment.

SUMMARY

In one embodiment, a packaged integrated circuit (IC) first interface device performs processing and transceiver functions to operate as a local slave on a first circuit board using an I2C bus, and an identical second interface device operates as a remote master on a remote board using an I2C bus. The invention is made use of when a master device on the first circuit board wants to communicate with a slave device on the remote circuit board. The master device controls the I2C clock on the first circuit board, while the second interface device controls the I2C clock on the remote circuit board.

Each of the boards internally communicates using their local I2C busses and I2C protocols, and the two interface devices are only needed for communications between the two boards. The two interface devices communicate with each other using robust differential data over a twisted wire pair. No SCL clock signal is transmitted over the twisted wire pair, so the original I2C clocked SDA signals (generated by either of the boards) must be encoded into the signal link by the local interface device for transmission, and then "reverse" processed by the remote interface device to essentially recreate the original I2C SDA signals for the remote I2C bus. Although only the master device controls the SCL of its local I2C bus, the interface device can hold down the SCL until the SDA information is ready to be placed on the I2C bus.

The differential signals over the twisted wire pair form a single serial bit stream over a single-channel bidirectional link. Although the differential signals use a non-inverted signal and an inverted signal, both signals convey the same bit. Other suitable single-channel links include a fiber optic link or a coaxial cable, where the outer shielding conductor conducts a reference voltage and the shielded center conductor conducts the bit stream. Thus, the I2C dual signal (or dual signal channel) is encoded by one of the interface devices to create a single serial bit stream, for transmission over a single-channel link, which is then decoded by the other interface device to recreate the original I2C dual signal for its local I2C bus.

By using the interface devices and the differential data communications, the communicating boards may be up to 1200 meters from each other, and the use of the twisted wire pair and common mode noise rejection allow the system to reliably communicate in a noisy environment using standard CAT-5 Ethernet cable. As mentioned above, other single-channel links may be used that are substantially impervious to noise. The interface devices are transparent to the boards' operations, so no changes are required for the I2C networks, allowing the invention to be easily incorporated into any I2C network.

The invention effectively allows multiple and distant boards to share an I2C bus.

Additional interface device pairs may tap off any of the I2C network boards to expand the system and the communication distances.

Other embodiments are disclosed.

BRIEF DESCRIPTION OF THE DRAWINGS

FIG. 1 illustrates two I2C network boards communicating with each other using differential signals over a twisted wire pair in accordance with one embodiment of the invention.

FIG. 2 illustrates the SDA driver for generating I2C data signals on the I2C bus. The same driver configuration is used for the SCL signals.

FIG. 3 illustrates the active pull-up and pull-down driver used to drive the twisted wire pair for the differential signals, enabling high speed, robust communications.

FIG. 4 illustrates certain functional units within the interface device.

Elements in the various figures that are the same or equivalent are labeled with the same numeral.

DETAILED DESCRIPTION

Figure 5:
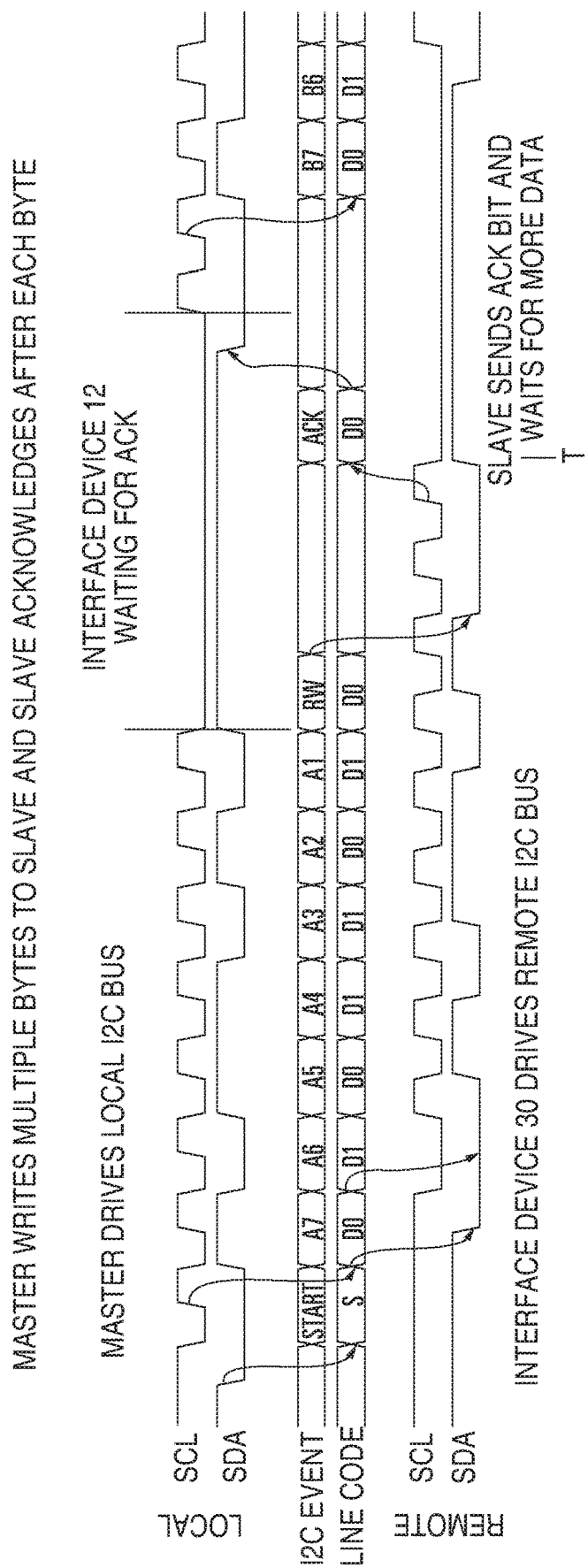
FIG. 5 illustrates an arbitrary write event, where a master device generates SCL and SDA signals on its local I2C bus for writing to an addressed remote slave device, and where the interface device on the master device's circuit board holds the SCL of the local I2C bus low to keep control of the local I2C bus while waiting for an ACK bit from the remote slave device.

The interface device of one embodiment of the present invention acts as a differential data communications interface between circuit boards, where each board uses a conventional intra-board I2C bus. Any conventional master on the boards can initiate communications between the two boards. The differential data may be transmitted on a twisted wire pair, allowing robust, high speed bidirectional communications between boards up to 1200 m. Common mode noise is easily rejected. I2C uses a passive pull-up serial data line (SDA) and serial clock line (SCL), and uses special codes and other protocols (e.g., acknowledgement bits). The differential data must encode all such I2C information from the local I2C bus, and the original I2C information must then be recovered on the remote board with a minimum of latency. The interface devices must handle acknowledgement bits and other I2C protocol issues. The interface devices are transparent to both boards so can be added without modification to the existing I2C network.

FIG. 1 illustrates an embodiment of the invention. A first circuit board contains a first interface device 12 having input/output ports connected to the local I2C bus on the first circuit board. Many I2C devices (e.g., controllers, sensors, etc.) may be mounted on the first circuit board and communicate with each other using their local I2C bus. The invention does not affect such intra-board communications. The I2C bus uses a serial data line (SDA) 14 and a serial clock line (SCL) 16. SDA 14 and SCL 16 are connected to pull-up resistors 18 and 20, respectively. The operating voltage on the first circuit board is assumed to be between 3V and 5V, and 5V is shown.

The interface device 12 is shown also having an ALERT port 22, pulled up by resistor 24, and a control (CTRL) pin 26. The ALERT feature is related to the SMBus protocol and is separate from the interface function for the I2C network, to be discussed later. Additional signals on other signal lines may also be encoded by the interface device 12.

All the devices on the first circuit board communicating with the I2C bus, including the interface device 12, use conventional open drain MOSFETs to pull down SDA 14 and SCL 16 to ground.

After the I2C signals on SDA 14 and SCL 16 are processed by the interface device 12, the resulting differential data is transmitted by an RS485-compliant transceiver over a twisted wire pair 28. The wires are labeled A and B, with B carrying the inverted signal.

An identical interface device 30 on a remote circuit board receives the differential data and converts the information back to the original I2C signals from the first circuit board. The remote circuit board may use a different operating voltage, such as 3.3V, so the I2C bus lines are pulled up to 3.3V by the associated pull-up resistors. The interface device 30 outputs the "recovered" original SDA signals on SDA 32 while generating the clock signals on SCL 34 of the I2C bus. So although the SCL for the I2C bus on the same circuit board as the master device is controlled by only the master device and not the local interface device 12 (except for clock stretching by the interface device 12), the remote interface device 30 controls the SCL of the remote I2C bus, which essentially emulates the original SCL signal generated by the master. The SCL signal frequency generated by the interface device 30 may be set by the user, using program pins (not shown) on the interface device 30, since the SCL frequency may be different for different systems. In one embodiment, the user may select one of nine possible SCL frequencies, with some dependence on the length of the twisted wire pair 28.

The interface device 30 also has an ALERT port and a CNTL port to handle SMBus protocols and special control signals unrelated to the I2C interface function. An ALERT code signals a fault event, a servicing event, and link status. An ALERT response protocol is then performed per the SMBus specfication.

The interface devices 12 and 30 may be assigned addresses to provide the capability of addressing a particular interface device to obtain status information or other information from it. Two program pins, with 3-state inputs, select one of eight possible addresses for the interface device.

The twisted wire pair 28 may be a CAT-5 cable up to 1200 meters. Any noise on the twisted wire pair will be common mode noise and be rejected by the RS485 transceivers in a well-known manner.

FIG. 2 illustrates the passive pull-up and active pull-down, by the open drain MOSFET 36, of the SDA 14 in a typical I2C network. The I2C transmitting device controls the operation of the MOSFET 36, and only one I2C transmitting device can control the I2C bus at any one time.

FIG. 3 illustrates an RS485 transmitter 38 that receives an input signal and outputs a differential signal on the twisted wire pair 28. The bit rate on the twisted wire pair 28 may be much faster than the I2C network bit rate.

FIG. 4 illustrates certain functional units within the interface device 12 (or the identical interface device 30). The interface device 12 is formed as a packaged integrated circuit. It is assumed in the following example that the interface device 12 is on the same circuit board as the master device, which initiates communication with an addressed slave device located on the remote circuit board.

The interface device 12 includes an I2C front end 40, which may employ a state machine, a processor, or other logic circuit that receives and buffers the original SDA and SCL signals on the local I2C bus, and converts the original I2C signal codes (e.g., START, STOP, data, addresses, etc.) to associated codes that can be transmitted using differential data on the twisted wire pair 28. In the preferred embodiment, the front end 40 uses a state machine that follows the I2C protocol by keeping track of the bit positions. The state machine detects the various I2C codes and bit positions to determine which SDA signals are START/STOP codes and when an ACK bit is required (after each 8-bit byte). When an ACK bit is required from an addressed device (after each byte) in the remote circuit board, the interface device 12 holds down the local SCL 16 to keep control of the local I2C bus until the ACK bit is transmitted as differential data over the twisted wire pair 28 and then converted to the ACK bit on the local I2C bus.

The interface device 12 then buffers each SDA signal from the local I2C bus using a TX FIFO 42. The SDA control signals, such as for START and STOP, are encoded into unique codes associated with the particular control function. The SDA signals are then forwarded by a link controller 44 to a line encoder 46, which then generates serial signals using Manchester coding. The encoded signals are then transmitted as differential data by the RS485-compliant transceiver 38.

Manchester encoding transitions from high to low or from low to high for each transmission "clock" cycle (although no clock signal is transmitted), and the differential data timing may be independent from the local I2C bus timing.

At the receive end of the twisted wire pair 28, the identical interface device 30 receives the differential data via the RS485 transceiver 48, decodes the differential data via the line decoder 50 to recreate the SDA signals, which are then transferred to a RX FIFO 52, via the link controller 44. Any control codes, such as the START and STOP code, are converted to the suitable SDA signals, and the state machine in the I2C front end 40 assigns the SDA signals bit positions. The interface device 30 then controls the local I2C bus to apply the recovered SDA signals to the SDA 32 while generating clock signals for the SCL 34. A programmable clock in the front end 40 of the interface device 30 generates the SCL 34 signals, and the clock signals are used to clock out the SDA signals by the state machine. As soon as a SDA data bit is ready in the RX FIFO buffer 52, the recovered SDA signals and SCL signals are transmitted on the local I2C bus.

While waiting for ACK bits or for otherwise waiting for a response from either the master or slave device, the interface device (either 12 or 30) pulls the local SCL low to maintain control of the I2C bus until the data is ready to be transmitted on the SDA of the local I2C bus. As previously mentioned, the interface device 30 controls the SCL timing for its local I2C bus, but the master device on the other board controls the timing of its local I2C bus (except for clock stretching by the interface device 12).

The clock stretching by the interface devices 12 and 30 allows the I2C rate to be independent from the link rate between the two interface devices 12 and 30. Thus, any delays do not affect the reliability of the data. Clock stretching may not be needed if the local SCL rate is slow and the differential link is short, such as less than 15 m, since the differential link may be set at a very high rate which reduces latency.

The interface devices 12 and 30 switch back and forth between transmitting modes and receiving modes due to the need for transmitting the data and then receiving the ACK bits, or for transmitting a request for information from the master device and then transmitting back the requested information from the addressed slave. The sending of data and the ACK signal continues until the transmitting device sends a STOP bit (SDA transitions from low to high while SCL is high).

The interface devices 12 and 30 may be set to a "slave function" (on the same board as the master controller) or a "master function" (on the other board) by signals applied to a program pin 53. These program signals may be fixed or may be dynamically varied. The slave function setting causes the interface device 12 to not generate the SCL signals on its local I2C bus, but only allow the master controller (on the same board) to generate the SCL signals, while the master function setting causes the interface device 30 to generate the SCL signals for its local I2C bus.

The invention is not limited to transmitting the inter-board communications via differential data and may instead use a balanced, single wire active pull-up and pull-down technique that communicates data long distances without problems with capacitance and speed. Shielded coaxial cable or fiber optic cable may be used instead of an unshielded twisted wire pair.

Since the capacitance of the I2C bus can be made low by the short conductors within the board, the local I2C speed can be high, such as up to 1 Mbps. The communications between the two interface devices 12 and 30 will not be a bottleneck to inter-board speed, despite the twisted wire pair 28 being over 1000 m long, due to the ability to communicate differential data on the twisted pair 28 at high speeds (e.g., 20 Mbps). Communicating via the twisted wire pair using differential data makes the system substantially insensitive to EMI, allowing its use in high-noise industrial environments.

The invention requires no change in software codes or hardware for the I2C master/slave devices.

Since some I2C and SMBus systems additionally include a separate interrupt (or ALERT) wire and control wire, the interface devices 12 and 30 include pins for receiving the ALERT and CTRL signals on those optional wires and processes those signals accordingly using a state controller. These additional signals are encoded into the differential data packets, as part of the single serial bit stream, for recovery by the other end of the link. Thus, the recovered ALERT and CTRL signals are applied at the other end on corresponding wires on the board's bus.

The RS485 driver within the interface devices 12 and 30 has three states: pull-up, pull-down, and open circuit. The differential data communication speed can be up to 20 Mbps.

The differential signals over the twisted wire pair 28 are a single serial bit stream over a single-channel link. Other suitable single-channel links include a fiber optic link or a coaxial cable, where the outer shielding conductor conducts a reference voltage and the shielded center conductor conducts the bit stream. In the coaxial cable embodiment, the center conductor is actively pulled up or down. Thus, the I2C dual signal (or dual signal channel signal) is encoded by one of the interface devices to create a single serial bit stream, for transmission over a single-channel link, which is then decoded by the other interface device to recreate the original I2C dual signal for its local I2C bus.

FIG. 5 illustrates an example of a write event where a master device (on the same board as the interface device 12) initiates communications with a slave device on the remote circuit board (containing the interface device 30) and transmits multiple bytes.

In the top waveform of FIG. 5, labeled LOCAL, the master device generates the SDA and SCL signals on SDA 14 and SCL 16 of the local I2C bus. After the START code (high to low SDA transition while SCL is high), 7 address bits plus a read/write bit are transmitted. The master device must now wait for an ACK bit from the addressed slave device before sending another byte. The interface device 12 (on the same board as the master device) holds the SCL 16 low while waiting for the ACK bit from the remote addressed slave. After the ACK bit is received by the master device, the master device then sends another byte of data to the remote slave.

The middle waveform of FIG. 5 illustrates the corresponding I2C event for each bit position, showing a START bit followed by the 7 address bits and the R/W bit. The ACK bit is also shown, followed by bits in the next byte sent by the master device.

The lower waveform in FIG. 5, labeled REMOTE, illustrates the SDA and SCL signals "recreated" by the remote interface device 30 on SDA 32 and SCL 34. Note the latency between the various waveforms due to processing and transmission times. The "recreated" SCL signals may be different from the original SCL signals due to different clock frequencies and clock stretching. Hence, the interface device 30 actually emulates the original SDA and SCL signals to have the same effect as the original SDA and SCL signals.

At time T in the lower waveform, the addressed slave device generates the ACK bit. The ACK bit is transmitted via the twisted wire pair, and the interface device 12 releases the SCL 16, to allow the master device to once again control the SCL signals on its local I2C bus, and transmits the ACK bit on the local I2C bus. The master device then transmits additional bytes, while the slave device transmits the ACK bit after each byte.

Since the read/write bit was set to write, the interface device 12 switches back to receiving the I2C signals from the master device immediately after receiving the ACK bit from the slave in order to encode additional bytes from the master device. Similarly, the interface device 30 is prepared to receive additional bytes from the encoded differential signals.

The master device may also request information from the slave, and the slave may respond with multiple bytes of data. This reading event by the master device is shown in FIG. 6.

Figure 6:
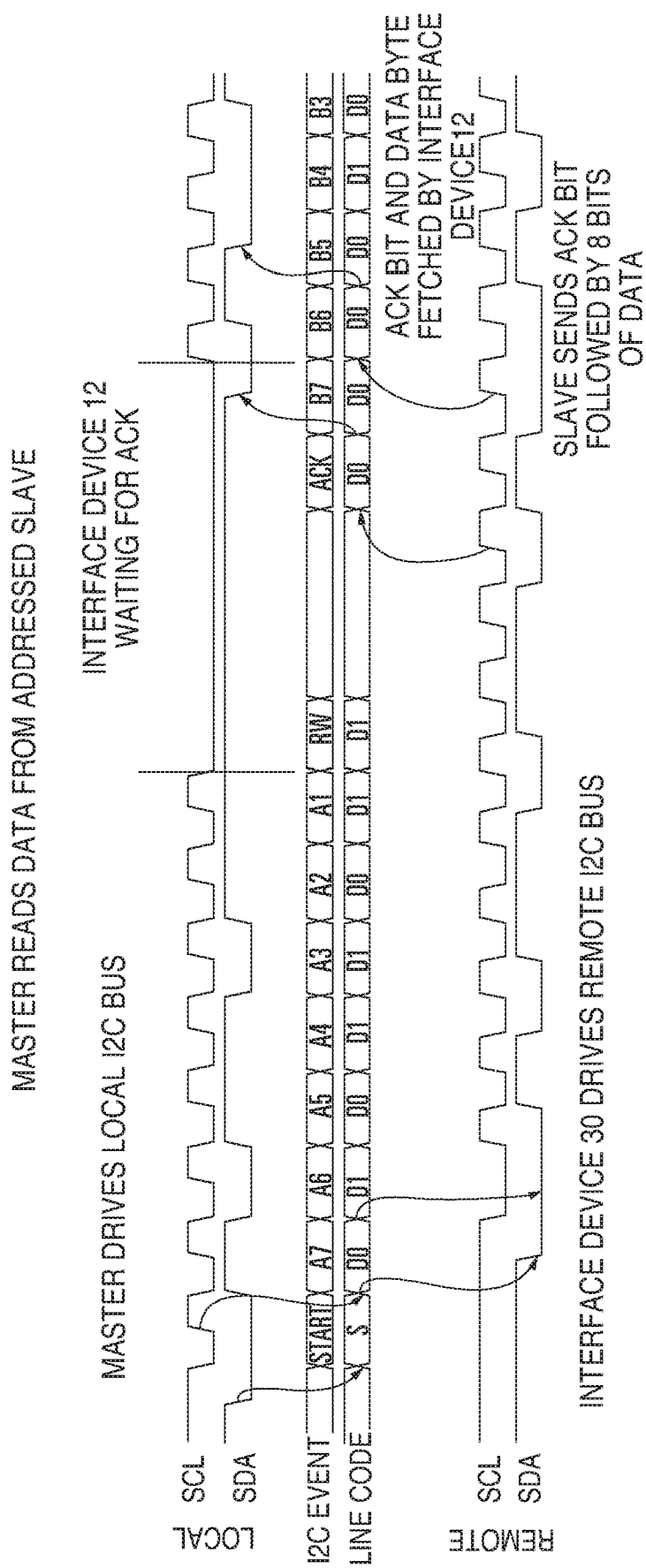
FIG. 6 illustrates an arbitrary read event, where the master device requests information from the addressed slave and the slave sends an ACK bit followed by data to the master device, and where the interface device on the master device's circuit board holds the SCL of the local I2C bus low to stall the local I2C bus while waiting for an ACK bit and data from the addressed slave.

In the top waveform of FIG. 6, labeled LOCAL, the master device transmits the START bit, 7 address bits, and the read/write bit for fetching information from the remote addressed slave. The read/write bit is set to read. The master device must now wait for an ACK bit followed by the requested information from the slave.

The middle waveform of FIG. 6 illustrates the corresponding I2C event for each bit position, showing a START bit followed by the 7 address bits and the R/W bit. The ACK bit from the slave is also shown, followed by bits sent by the slave.

The bottom waveform of FIG. 6, labeled REMOTE, shows, on the left side, the interface device 30 driving its local I2C for communicating with the addressed slave. The slave then responds with the ACK bit followed by a string of bits in response to the request for information from the master device. The interface device 12 (on the same board as the master device) holds down the SCL 16 while waiting for the ACK bit to keep control of the I2C bus. Once the ACK bit is received, the interface device 12 releases the SCL 16 and transmits the subsequent SDA signals from the remote slave to the local I2C bus as they become available. Additional SCL stretching may be used by the interface device 12 if SDA data is not yet available. Since the R/W bit was set to read, the interface device 12 is immediately ready to receive more information from the slave, while the interface device 30 is prepared to receive the information from the slave while generating the local SCL signal.

The two interface devices 12 and 30 are thus signaled to receive or transmit based on the state of the R/W signal and the reception of the ACK signal. Thus, transmission and reception reverse after each byte.

The clock frequency on the remote I2C bus may be different from the original clock frequency since the I2C busses are independently clocked and may include clock stretching.

After every byte, either the master device or slave must transmit an ACK bit, while the appropriate one of the interface devices holds down the SCL while waiting for the ACK bit. The process is repeated for each byte until the STOP bit is detected.

Figure 7:
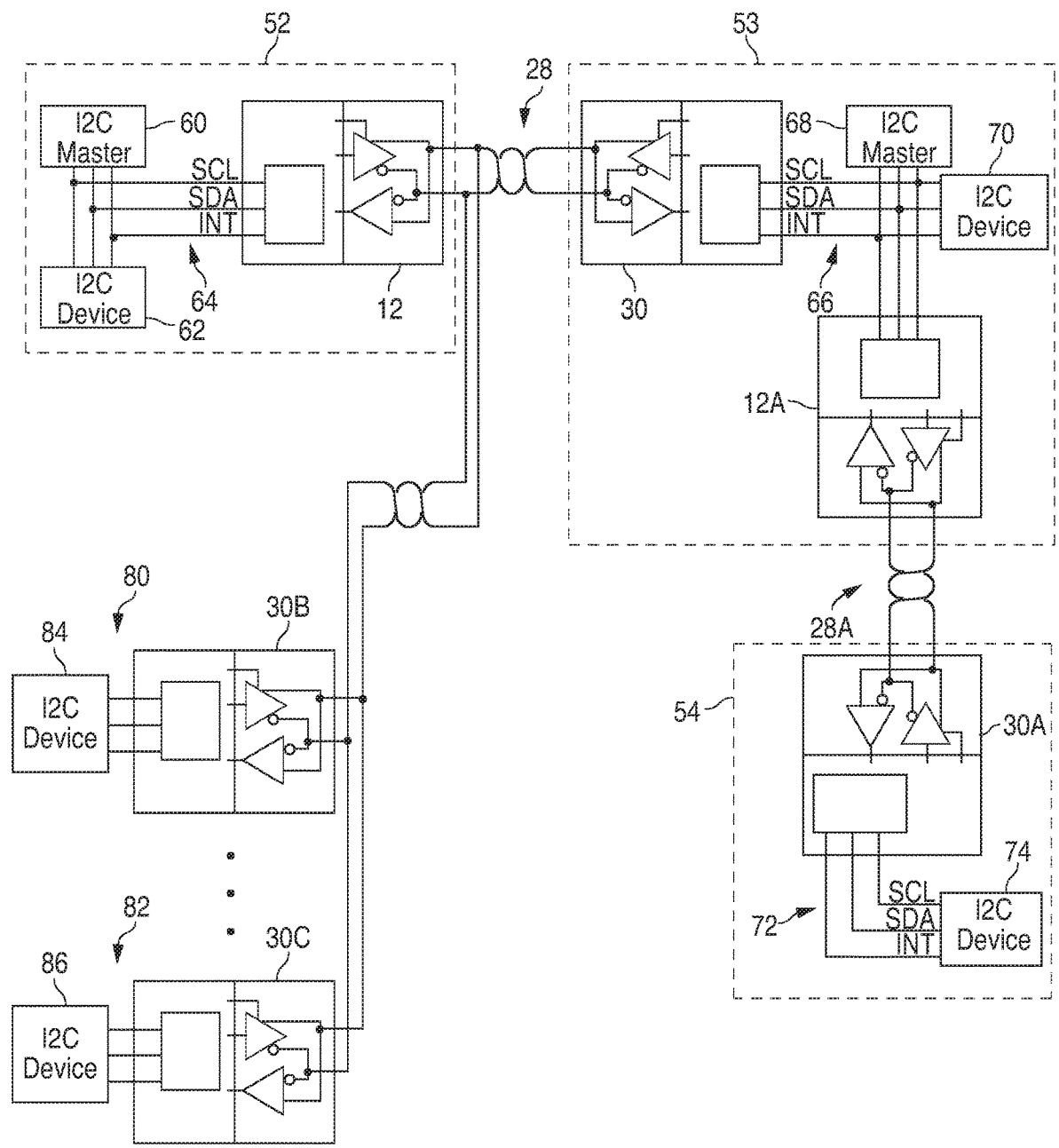
FIG. 7 illustrates how additional interface devices may tap off I2C busses or the twisted wire pair to extend the system.

As shown in FIG. 7, any number of "extended slave" links (using a pair of interface devices connected via a twisted wire pair) can be used by tapping any I2C bus in the system and connecting it to an interface device. Therefore, one differential data link can be used between two boards 52 and 53, and another differential data link can be used between the board 53 and another board 54. Specifically, FIG. 7 shows a master device 60, a slave device 62, a local I2C bus 64 (including a SMBbus interrupt or ALERT line), the interface device 12 (and its transceiver) on a single circuit board 52. A first remote circuit board 53 contains the interface device 30 (set to master mode since it controls the local SCL), an I2C bus 66, and two slave devices 68 and 70. Also contained on the first remote circuit board 53 is another interface device 12A (set to slave mode since it does not control the local SCL) coupled to the I2C bus 66. On a second remote circuit board 54 is an interface device 30A coupled to another I2C bus 72 and another slave device 74. The master device 60 may communicate with any of the local or remote slave devices via the twisted wire pairs 28 and 28A using the techniques described above.

Also shown in FIG. 7 are any number of additional boards 80 and 82 containing the interface devices 30B and 30C coupled to associated slave devices 84 and 86. The boards 80 and 82 receive the encoded differential data on the twisted wire pair 28.

In all embodiments, the interface device may also encode into the differential data signal error detection codes, such as parity bits, CRC, or other error correction codes. The codes may be at predetermined bit positions so the receiving interface device knows that the signals convey such error codes. The receiving interface device then retrieves these codes and performs the associated correction function or requests that the packet be repeated.

Additional signals, including the CNTL signal and general purpose I/O signals, can also be encoded into the differential signal along with the I2C bus signals. Thus, the system can be customized to convey any information in addition to the I2C data.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A communication system comprising:
   first devices on a first circuit board coupled to a first I2C bus, the first devices including a master device for initiating communications,
   the first I2C bus having a first data conductor for serial first data signals and having a first clock conductor for serial first clock signals, the first devices communicating with each other on the first circuit board via the first I2C bus,
   the serial first data signals comprising event codes including START and STOP codes that are conveyed by a combination of signals simultaneously conducted by the first data conductor and the first clock conductor;
   second devices on a second circuit board coupled to a second I2C bus, the second devices including a slave device for communicating with the master device,
   the second I2C bus having a second data conductor for serial second data signals and having a second clock conductor for serial second clock signals;
   a first interface device coupled to the first I2C bus for processing the serial first data signals and the serial first clock signals on the first I2C bus to generate an encoded serial bit stream for transmission over a single-channel bidirectional link, the encoded serial bit stream being a differential bit stream over a wire pair, where the differential bit stream conveys the event codes as well as all other data and clock information; and
   a second interface device coupled to the wire pair and to the second I2C bus for processing the encoded serial bit stream, the second interface device generating the serial second data signals and the serial second clock signals on the second I2C bus to emulate the serial first data signals and serial first clock signals on the first I2C bus when the master device on the first circuit board communicates with the slave device on the second circuit board.

2. The system of claim 1 wherein the first interface device pulls down the first clock conductor in the first I2C bus to delay clock signal transitions on the first I2C bus to deal with line latencies and second I2C bus response time.

3. The system of claim 1 wherein the single-channel bidirectional link is a twisted wire pair and the encoded serial bit stream is differential signals over the twisted wire pair.

4. The system of claim 3 wherein the twisted wire pair is a CAT-5 cable.

5. The system of claim 1 wherein the first interface device is configured to pull down the first clock conductor in the first I2C bus while waiting for a response from the slave device.

6. The system of claim 1 wherein the master device is configured to generate the serial first clock signals for the first I2C bus, and the second interface device is configured to generate the serial second clock signals for the second I2C bus.

7. The system of claim 6 wherein a frequency of the serial second clock signals is controllable by programming the second interface device.

8. The system of claim 1 wherein the first interface device comprises a first RS485 transceiver coupled to the single-channel bidirectional link, and the second interface device comprises a second RS485 transceiver coupled to the single-channel bidirectional link.

9. The system of claim 1 wherein the first interface device uses Manchester encoding for processing the serial first data signals and the serial first clock signals for generating the encoded serial bit stream.

10. The system of claim 1 wherein the START code comprises the first data signal transitioning from high to low while the first clock signal is high, wherein the STOP code comprises the first data signal transitioning from low to high while the first clock signal is high, and wherein the first interface device encodes the START and STOP codes in the encoded serial bit stream.

11. The system of claim 1 wherein the encoded serial bit stream also includes error correction codes.

12. The system of claim 1 wherein the encoded serial bit stream also includes codes for identifying a status of the communications system.

13. The system of claim 1 wherein the single-channel bidirectional link is a first single-channel bidirectional link, the system further comprising:
   a third circuit board having a third I2C bus;
   a third interface device coupled to the third I2C bus;
   a fourth interface device coupled to the second I2C bus; and
   a second single-channel bidirectional link coupled between the third interface device and the fourth interface device, wherein the fourth interface device processes the serial second data signals and the serial second clock signals and generates a second serial bit stream on the second single-channel bidirectional link, wherein the third interface device receives the second serial bit stream on the second single-channel bidirectional link and generates third data signals and third clock signals on the third I2C bus to emulate the serial first data signals and serial first clock signals on the first I2C bus.

14. The system of claim 1 wherein the single-channel bidirectional link is a first single-channel bidirectional link, the system further comprising:
   a third circuit board having a third I2C bus;
   a third interface device coupled to the third I2C bus; and
   a second single-channel bidirectional link coupled to the first single-channel bidirectional link, wherein the third interface device receives the encoded serial bit stream on the second single-channel bidirectional link and generates third data signals and third clock signals on the third I2C bus to emulate the serial first data signals and serial first clock signals on the first I2C bus.

15. The system of claim 1 wherein the first interface device is mounted on the first circuit board.

16. The system of claim 15 wherein the second interface device is mounted on the second circuit board.

17. An interface device comprising:
   input ports for receiving serial data signals from a local I2C bus; and processing circuitry for converting the serial data on the local I2C bus to a serial bit stream over a single-channel link, the interface device being configurable, by at least one program pin, to either receive clock signals from the local I2C bus or generate clock signals for application to the local I2C bus.

18. A method for communicating between circuit boards comprising:

providing first devices on a first circuit board coupled to a first I2C bus, the first devices including a master device for initiating communications, the first I2C bus having a first data conductor for serial first data signals and having a first clock conductor for serial first clock signals, the first devices communicating with each other on the first circuit board via the first I2C bus, the serial first data signals comprising event codes including START and STOP codes that are conveyed by a combination of signals simultaneously conducted by the first data conductor and the first clock conductor;

providing second devices on a second circuit board coupled to a second I2C bus, the second devices including a slave device communicating with the master device, the second I2C bus having a second data conductor for serial second data signals and having a second clock conductor for serial second clock signals;

processing the serial first data signals and the serial first clock signals on the first I2C bus, by a first interface device, coupled to the first I2C bus, to generate an encoded serial bit stream for transmission over a single-channel link, the encoded serial bit stream being a differential bit stream over a wire pair, where the differential bit stream conveys the event codes as well as all other data and clock information;

processing the encoded serial bit stream by a second interface device coupled to the single-channel link and to the second I2C bus; and the second interface device generating the serial second data signals and the serial second clock signals on the second I2C bus to emulate the serial first data signals and serial first clock signals on the first I2C bus when the master device on the first circuit board communicates with the slave device on the second circuit board.

19. The method of claim 18 further comprising the first interface device pulling down the first clock conductor in the first I2C bus, after the master has transmitted a byte, while waiting for a response from the slave.

20. The method of claim 18 further comprising the master device generating the serial first clock signals for the first I2C bus, and the second interface device generating the serial second clock signals for the second I2C bus.

21. The method of claim 18 wherein the START code comprises the serial first data signal transitioning from high to low while the serial first clock signal is high, wherein the STOP code comprises the serial first data signal transitioning from low to high while the serial first clock signal is high, and wherein the first interface device encodes the START and STOP codes in the encoded serial bit stream.

22. A communication device for converting I2C data and clock signals on an I2C bus into an encoded serial bit stream for transmission over a single-channel bidirectional link, the I2C bus having a first data conductor for serial first data signals and having a first clock conductor for serial first clock signals, the data signals including event codes comprising START and STOP codes that are conveyed by a combination of signals simultaneously conducted by the first data conductor and the first clock conductor, the device comprising:

a first interface device configured to be coupled to the I2C bus for processing the data signals and the clock signals on the I2C bus to generate an encoded serial bit stream for transmission over a single-channel bidirectional link, the encoded serial bit stream being a differential bit stream over the wire pair, where the differential bit stream conveys the event codes as well as all other data and clock information.

* * * * *